US007584408B2

(12) United States Patent
Hu et al.

(10) Patent No.: US 7,584,408 B2
(45) Date of Patent: Sep. 1, 2009

(54) VITERBI PATH GENERATION FOR A DYNAMIC BAYESIAN NETWORK

(75) Inventors: Wei Hu, Beijing (CN); Yimin Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 678 days.

(21) Appl. No.: 11/352,657

(22) Filed: Feb. 13, 2006

(65) Prior Publication Data

US 2006/0212786 A1 Sep. 21, 2006

Related U.S. Application Data

(63) Continuation of application No. PCT/CN03/00840, filed on Sep. 30, 2003.

(51) Int. Cl.
*H03M 13/41* (2006.01)
(52) U.S. Cl. ...................... 714/795; 704/242
(58) Field of Classification Search ................. 714/795; 704/242
See application file for complete search history.

(56) References Cited

U.S. PATENT DOCUMENTS

| 4,713,777 | A * | 12/1987 | Klovstad et al. ............ 704/233 |
| 5,040,127 | A * | 8/1991 | Gerson ....................... 704/255 |
| 5,199,077 | A * | 3/1993 | Wilcox et al. ............... 704/256 |
| 6,965,861 | B1 * | 11/2005 | Dailey et al. ................ 704/242 |
| 6,999,926 | B2 * | 2/2006 | Yuk et al. ................... 704/244 |
| 7,203,635 | B2 * | 4/2007 | Oliver et al. ................. 703/22 |

FOREIGN PATENT DOCUMENTS

| CN | 1420486 | 5/2003 |
| WO | WO-02103567 A1 | 12/2002 |

OTHER PUBLICATIONS

Brown et al., "Partial Traceback and Dynamic Programming", ICASSP '82, May 1982, pp. 1629-1632.*
Thelen, "Long Term On-Line Speaker Adaptation for Large Vocabulary Dictation", ICSLP '96, Oct. 1996, pp. 2139-2142.*
Chamberlain et al., "ZIP: A Dynamic Programming Algorithm for Time-Aligning Two Indefinitely Long Utterances", ICASSP '83, Apr. 1983, pp. 816-819.*
Ney et al., "Data Driven Search Organization for Continuous Speech Recognition", IEEE Transactions on Signal Processing, vol. 40, No. 2, Feb. 1992, pp. 272-281.*
Bezie et al., "Beam Search and Partial Traceback in the Frame-Synchronous Two-Level Algorithm (TLBS)", ICASSP '93, Apr. 1993, pp. II-511-II-514.*

(Continued)

*Primary Examiner*—Stephen M Baker
(74) *Attorney, Agent, or Firm*—Schwegman, Lundberg & Woessner, P.A.

(57) ABSTRACT

Methods, systems, and apparatus are provided to generate a Viterbi path for a DBN. The DBN is converted to a chain of junction trees, where each tree represents a decision-making process. The trees are forwardly iterated and the Viterbi path is generated during the forward iteration (forward pass). This is achieved by maintaining backpointers to previously processed junction trees during the forward pass and dynamically assembling the Viterbi with each pair of junction trees during the forward pass.

6 Claims, 5 Drawing Sheets

OTHER PUBLICATIONS

Pavlovic et al., "Time-Series Classification Using Mixed-State Dynamic Bayesisan Networks", 1999 IEEE Conference on Computer Vision and Pattern Recognition, Jun. 1999, pp. 609-615.*

Renals et al., "Start-Synchronous Search for Large Vocabulary Continuous Speech Recognition", IEEE Transactions on Speech and Audio Processing, vol. 7, No. 5, Sep. 1999, pp. 542-553.*

Czaja et al., "Variable Data Rate Viterbi Decoderwith Modified LOVA Algorithm", TENCON '95, Nov. 1995, pp. 472-475.*

Murphy, K. P., "Dynamic Bayesian Networks: Representation, Inference and Learning", *UC Berkeley, Computer Science Division*, (Jul. 2002),1-11, 18-89, 102-103, 148-199.

"Chinese Application Serial No. 03827127.3 Office Action mailed May 23, 2008", 19 pgs.

* cited by examiner

VITERBI PATH GENERATION FOR A DYNAMIC BAYESIAN NETWORK

This application is a continuation under 35 U.S.C. 111 (a) of International Application Serial No. PCT/CN2003/000840, filed 30 Sep. 2003, and published in English as International Application No. WO 2005/031590 A1 on 7 Apr. 2005, which is incorporated herein by reference.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in any drawings hereto: Copyright© 2003, Intel, Corporation, All Rights Reserved.

TECHNICAL FIELD

Embodiments of the present invention relate generally to networks and graphic models, and more particularly to Viterbi path generation for a Dynamic Bayesian Network (DBN).

BACKGROUND INFORMATION

Dynamic Bayesian Networks (DBNs) have been widely used in software applications for purposes of making dynamic decisions by electronically modeling decision processes. Some example applications that are particularly well suited for DBNs include speech recognition, visual tracking, pattern recognition, and the like.

DBN is based on Bayesian logic which is generally applied to automated decision making and inferential statistics that deals with probability inference.

A DBN application differs from a static Bayesian Network in that the DBN can adjust itself over time for stochastic (probabilistic) variables. Since most decisions evolve over time, DBN applications are typically favored over static Bayesian Network applications.

A Viterbi path is an optimal Most Probable Explanation (MPE) decision state sequence for a given sequence of observed outputs. In other words, if a result is known, the Viterbi path is a most likely path of the states for all hidden variables. The Viterbi path best explains a particular result. Once a DBN has been trained or used for a few different decisions, the DBN can be used to produce its own decision based on observable evidence for a given problem, or used to evaluate different observations. Thus, the DBN is particularly well suited for electronic applications that are difficult to program in order to capture all known possibilities, such as speech recognition, visual tracking, pattern recognition, and the like.

A number of conventional algorithms have been developed in order to generate a Viterbi path from a DBN. One popular algorithm was developed by Kevin P. Murphy (KPM algorithm). The KPM algorithm finds the Viterbi path by processing a forward loop (referred to as the "forward pass") and backward loop (referred to as the "backward pass") on the DBN. This technique is computationally expensive and utilizes excessive and unnecessary memory since during the backward pass all potential values (probabilities) of the junction trees (trees derived from the DBN) are needed to determine the Viterbi path. Moreover, because of memory requirements needed to save the potential values, if a complex DBN or long observation sequence is needed, then the KPM algorithm becomes incapable or impractical to use for generating the Viterbi path.

Therefore, there is a need for improved Viterbi path generation with DBNs.

DESCRIPTION OF THE EMBODIMENTS

Novel methods, systems, and apparatuses for generating Viterbi paths for DBNs are described. In the following detailed description of the embodiments, reference is made to the accompanying drawings, which form a part hereof, and in which are shown by way of illustration, but not limitation, specific embodiments of the invention that may be practiced. These embodiments are described in sufficient detail to enable one of ordinary skill in the art to understand and implement them. Other embodiments may be utilized; and structural, logical, and electrical changes may be made without departing from the spirit and scope of the present disclosure. The following detailed description is, therefore, not to be taken in a limiting sense, and the scope of the embodiments of the inventions disclosed herein is defined only by the appended claims.

Figure 1:
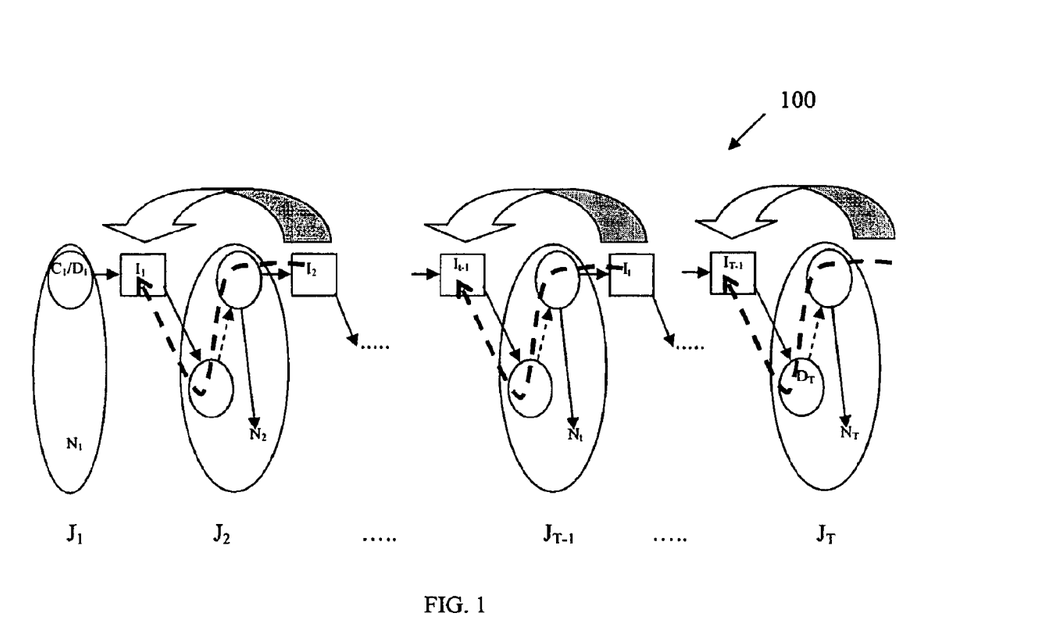
FIG. 1 is diagram of a technique to generate a Viterbi path for a DBN in accordance with one embodiment of the invention.

FIG. 1 is a diagram for a technique to generate a Viterbi path for a DBN. The technique is implemented in a computer-accessible medium as one or more software applications.

Initially, a decision making process is embodied in a DBN 100 and a number of junction trees $J_1$ through $J_T$ (depicted as ovals in FIG. 1) are derived from DBN 100. Junction trees are tree chains derived from the DBN 100 where loops within each tree have been removed. Logically, junction trees can be viewed as one or more related decision states. Existing and well known techniques provide the ability to automatically derive junction trees from a DBN 100.

The square boxes of FIG. 1 represent interface cliques for the DBN 100. Interface cliques are special cliques that are used to interface to other junction trees (transitions). Moreover, $C_1$ to $C_T$ and $D_1$ to $D_T$ are the "out-cliques" and "in-cliques," respectively, for junction trees $J_1$ through $J_T$. $N_1$ though $N_T$ represent other cliques for each of the junction trees. Again, cliques are derivable using existing and well known utilities associated with a DBN 100.

Before the DBN 100 is used, the potentials for each junction tree is initialized. The potentials are the probabilities assigned to cliques of each junction tree, and are used during operation for determining the transitions from one decision state to another decision state.

The arrows moving from $J_1$ to $J_T$ represent a forward iteration of the DBN 100 for purposes of generating the Viterbi path. During a forward pass, evidence is collected from each out-clique ($C_1$ through $C_T$), each in-clique ($D_1$ through $D_T$) and the other cliques ($N_1$ through $N_T$). Evidence includes known (observable) values for variables that are present for any particular decision state of the DBN 100 for a given electronic problem that is being evaluated with the DBN 100.

However, in embodiments of this invention, a full backward pass is not necessary. This is achieved by performing a local backtracking during the forward pass for each junction tree pair from $J_1$ to $J_T$ during the forward pass. Thus, as the forward pass processes, the Viterbi path is dynamically determined, such that when the forward pass is completed a complete Viterbi path is readily assembled. The large block arrows of FIG. 1 depict the backtracking for each junction tree pair.

In one embodiment, the backtracking occurs after a second junction tree of a pair of junction trees has gathered its observable evidence. As each junction tree transitions to a next junction tree, local back pointers to the just processed junction tree are stored, such that when the next junction tree of a pair of junction trees gathers its observable evidence, the local back pointers associated with the previously processed junction tree are passed to the backtracking process. The backtracking process uses these local back pointers to maximize a sub path from the interface clique of the current junction tree back to the initial interface clique of the previously processed junction tree. The acquired sub paths are then concatenated to one another when a full forward pass is completed on the DBN 100. The resulting paths are sufficient to acquire the desired Viterbi path for the DBN 100.

By using back pointers to do backtracking between pairs of junction trees, excessive computations are avoided and less memory is consumed than what has been conventionally necessary for a full forward and backward pass on the DBN 100 when generating a Viterbi path. All potentials that had been used can be deleted, only the results of each local backtracking need to be saved. Accordingly, a more selective forward pass that uses local backtracking processing with local back pointers provides improved Viterbi path generation for DBNs 100.

A sample block of pseudo code (conforming generally to the C programming language) that implements one embodiment of FIG. 1 can appear as follows for the selective forward pass of the DBN 100 with backtracking:

```
/* Begin selective forward pass main processing routine
For t=1 to T Do;
    Initialize all potentials in J_t;
    D_t = D_t * I_{t-1}; /* except D_1 (initial in-clique of DBN 100)
    In J_t collect evidence from D_t, N_t to C_t;
    Store backpointers into variable jtree_bpointer{t} and delete all
potentials;
    Maximize C_t to I_t and store backpointer in variable C2I_bpointer{t};
    Interface_bpointer{t} = local_backtracking(I_t, I_{t-1}, jtree_bpointer{t},
C2I_bpointer{t});
    /* local_backtracking defined below as independent subroutine
End;
Find the maximum entry in I_T, save the index of the entry to max_i{t};
For t=T to 1 Do;
    Max_i{t} = interface_bpointer{t+1}(max_i{t+1});
    /* MPE (Viterbi path) for those interface variables are now known
End;
For t=T to 1 Do;
    Find the maximum entry j in C_T, according to max_i{t};
    Viterbi_path{t} = backtracking_in_tree(J_T, jtree_bpointer{t}, j);
    /*backtracking_in_tree routine defined below
End;
/* End selective forward pass processing
/* Pseudo code for the backtracking_in_tree subroutine
```

```
function backtracking_in_tree(jtree, backpointer, max);
Begin;
    MPE = [ ];
    Max_entry = [ ];
    For P = pre-order of the junction tree Do;
        For C = children of P Do;
            Max = Max_entry(P);
            According to max, find a corresponding entry in
separator {P, C} as j;
            Max = backpointer{P, C}(j);
            Max_entry(C) = max;
            MPE(C) = convert max to configuration;
        End; /* inner for loop
    End; /* outer for loop
    Convert the MPE to Viterbi_path;
End; /* backtracking_in_tree subroutine
/* Pseudo code for the local_backtracking subroutine
function local_backtracking(If, lb, J, jtree_bpointer, C2I_bpointer;
Begin;
    N = sizeof(If);
    interface_bpointer = zeros(1, N);
    for i=1 to N Do;
        Find the corresponding entry j in C, according to I and
C2I_bpointer;
        Do a backtracking_in_tree(J, jtree_bpointer,j) partially, until the
corresponding entry in D is found as m;
        Find entry k in lb that corresponds with m;
        Interface_bpointer(i) = k;
End; /* local_backtracking subroutine
        © Intel Corporation 2003
```

Notice that, unlike conventional methods in generating the Viterbi path that the processing depicted above traverses the DBN 100 with only a single selective forward pass. The For-loops defined above in the example pseudo code includes only one forward pass of the DBN 100, the inner For-loop of the main selective forward pass processing is defined as:

```
For t=T to 1 Do;
    Max_i{t}=interface_bpointer{t=1}(max_i{t+1});
End;
```

This For-loop is simply traversing a pointer data structure to assemble the Viterbi path; the interface variables for the Viterbi path are already known at this point. Thus, there is no need to re-evaluate the entire DBN 100 and all its potentials with a full backward pass of the DBN 100 as is conventionally required. Notice also that the next inner For-loop is defined as:

```
For t=T to 1 do;
    Find the maximum entry j in CT, according to max_i{t};
    Viterbi_path{t}=backtracking_in_tree(J_T,
        jtree_bpointer{t},j);
End;
```

This For-loop can be avoided altogether if other non interface clique variables are not a concern for the Viterbi path. Moreover, this particular For-loop can be parallelized because at this point in processing there are no longer any data conflicts in the DBN 100 that would prevent such parallelization. In contrast, conventional techniques require a full backward pass of the entire DBN.

Figure 2:
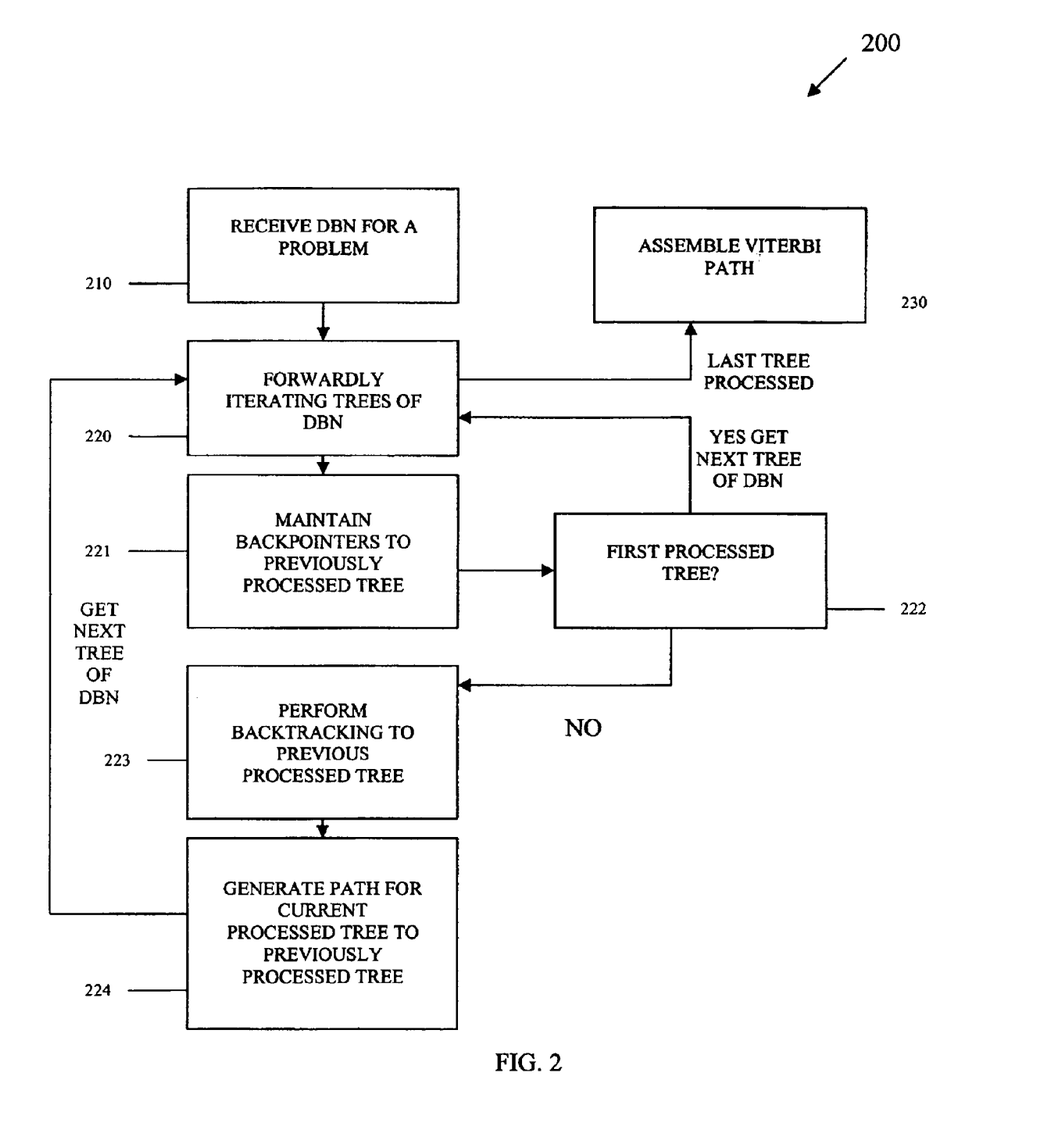
FIG. 2 is a flow diagram of a method to generate a Viterbi path for a DBN in accordance with one embodiment of the invention.

FIG. 2 is a flow diagram of one method 200 for generating a Viterbi path of a DBN. The method can be implemented in a computer-accessible medium as one or more software modules cooperating with on another.

Initially, at 210, a DBN for a given electronic problem is received by the processing of the method 200. The DBN includes derived junction trees, in-cliques, out-cliques, and other cliques. Each set of trees represent a particular decision state within a decision process for the problem. The purpose of the DBN is to find the Viterbi path or most probable explanation for a result or answer to the problem. This Viterbi path can be used to consistently predict and arrive at the answer for a similar set of evidence (observed values for variables needed with each of the decision states). The Viterbi path is therefore considered a best or optimal path through the DBN for the problem in reaching the result.

At 220, to generate the Viterbi path, the method 200 performs a forward iteration (forward pass) against the DBN. This forward pass is all that is needed to generate the Viterbi path for the problem and the result. During the forward pass each junction tree beginning with the first junction tree of the DBN are evaluated for purposes of generating the Viterbi path. All potentials (probabilities) for choices within the trees are initialized. Also, all available observable evidence (value assignments for variables used in each of the decision states of the trees for the first junction tree) associated with the given problem is recorded. Next, best path candidates for moving from the first out-clique through the first junction tree and to the first interface clique is found. Then, at 221, the pointers to the in-clique, the out-clique, and any other cliques of the first junction tree and the best path candidates are stored or maintained.

At 222, during the forward pass a check is made to determine if the first processed junction tree is in fact the first tree, and if this is the case then, the forward pass continues with the next junction tree of the DBN. Again, with the next junction tree being processed, all potentials are initialized, all available observable evidence is collected and properly assigned to the decision states, and best path candidates from the out-clique through the junction tree to the interface clique are found. Then, at 221, backpointers are maintained to the next junction tree, its out-clique, its in-clique, and its best path candidates. A check is again made at 222 to determine if the current processed junction tree is the first junction tree of the DBN, which in this case it is not, so processing continues at 223.

At 223, the backtracking processing described above with the discussion of FIG. 1 is performed on the current junction tree being processed back to the previous junction tree that was immediately processed before the current junction tree. Here, a linkage is made to link the best path candidates of the previous processed junction tree to the best path candidates of the current junction tree. Thus, at 224, longer path candidates are generated with the backtracking processing that goes through the previous junction tree's out-clique through its junction tree and out its in-clique to its interface clique where it is linked with the current junction tree's out-clique through its junction tree out its in-clique and to the next interface clique.

Then, at 224, the processing returns back to 220 to continue on with the forward pass through the DBN by acquiring the next junction tree. When the next junction tree is null then the forward pass terminates and processing resumes at 230. At 230, the Viterbi path is assembled from the maintained backpointers by iterating the retained variables (maximum interface variables for decision states and path pointers) and pointers of the maintained backpointers. Upon exiting the forward pass, the backpointers contain all the information necessary to construct the Viterbi path for the given problem through the DBN.

During iterations of the forward pass (except for the first iteration) selective backtracking occurs using the maintained backpointers to evaluate a pair of junction trees with one another. These backpointers can be easily referenced within the forward pass by using an integer value T that corresponds to the current iteration of the forward pass. As an example, when the current forward pass iteration is 2, the backpointers are referenced in a backpointer data structure to acquire the previous processed junction tree of 2−1, or 1.

When backtracking for a pair of junction trees occurs, the retained pointer to the previously processed junction tree will point to the parent node or root node of that junction tree, such that processing can iterate the children of that parent node by traversing the links of the trees. This permits the best path candidates to be constructed through the children and parent node of the previously processed junction tree to the current junction tree being processed.

Figure 3:
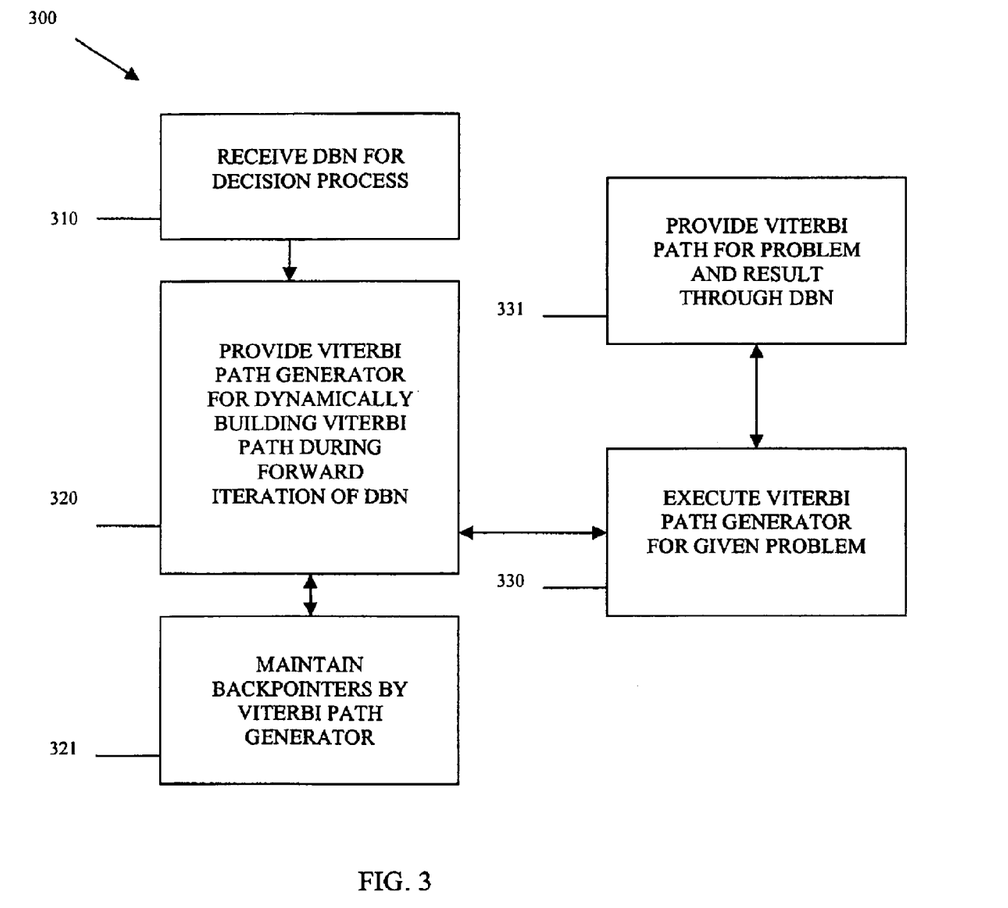
FIG. 3 is a flow diagram of another method to generate a Viterbi path for a DBN in accordance with one embodiment of the invention.

FIG. 3 is a flow chart of another method 300 for dynamically generating a Viterbi path for a DBN. The processing of method 300 can be implemented in a computer-accessible medium within one or more software modules.

At 310, a DBN representation of a decision process is received. This representation can be provided and manipulated using a variety of well known and available tools. These tools permit the DBN to be constructed as junction trees, in-cliques, out-cliques, and other cliques. Each tree represents a particular decision state for the problem being evaluated. These tools also permit observable evidence (values for a number of the nodes of the trees) to be assigned and recovered from the nodes or trees. Further, the tools permit potentials or probabilities and dependencies to be assigned and changed within the trees.

At 320, a Viterbi path generator is provided. The Viterbi path generator, when executed, performs a single forward iteration (forward pass) on the DBN for a given problem and result, for purposes of dynamically generating the Viterbi path for the problem and result through the DBN. In doing this, the Viterbi path generator maintains backpointers, at 321, to the previously processed junction tree, in-clique, out-clique, and best path candidates through the previously processed junction tree. These backpointers are maintained during each iteration and used to perform local backtracking from a current junction tree to an immediate previously processed junction tree, where the current and previous junction trees form a pair of junction trees that are evaluated on each iteration (except the first iteration where no previous junction tree exists).

When the Viterbi path generator is executed at 330, the Viterbi path generator performs the single forward pass on the DBN for the given problem and result and maintains the backpointers at 321. After the forward pass is completed, the backpointers are iterated to assemble the Viterbi path for the given problem and result at 331. Conventionally, a full additional backward iteration (backward pass) on the entire DBN was necessary after the forward pass was completed in order to generate the Viterbi path. This required all the potentials within the DBN and observable evidence to be maintained and recollected or gathered. As a result, the processing was slow and impractical for large DBNs and required a substantial amount of memory. With the techniques embodied in the Viterbi path generator, processing is expedited and memory requirements reduced, since only a single forward pass with backtracking is necessary in order to generate the Viterbi path.

In one embodiment, the given problem is related to speech recognition and the DBN is initially configured to recognize and communicate speech though one or more electronic devices. Devices for capturing audio data (e.g., microphones and the like) are well known in the electronic arts, as are devices for communicating audio data (e.g., sound cards, drivers, and the like). Any such devices can be interfaced with software embodiments of this invention. In such an example embodiment, the DBN is trained on a number of voice snippets where the result is known and the techniques presented herein are used to generate Viterbi paths. Thus, when a new situation presents itself, the DBN has been trained to optimally follow a Viterbi path to a result and perform the actions (e.g., communicate in speech) dictated by the result. Of course other problems related to pattern recognition and image tracking in image or video data are equally well-suited to the embodiments of this invention.

Figure 4:
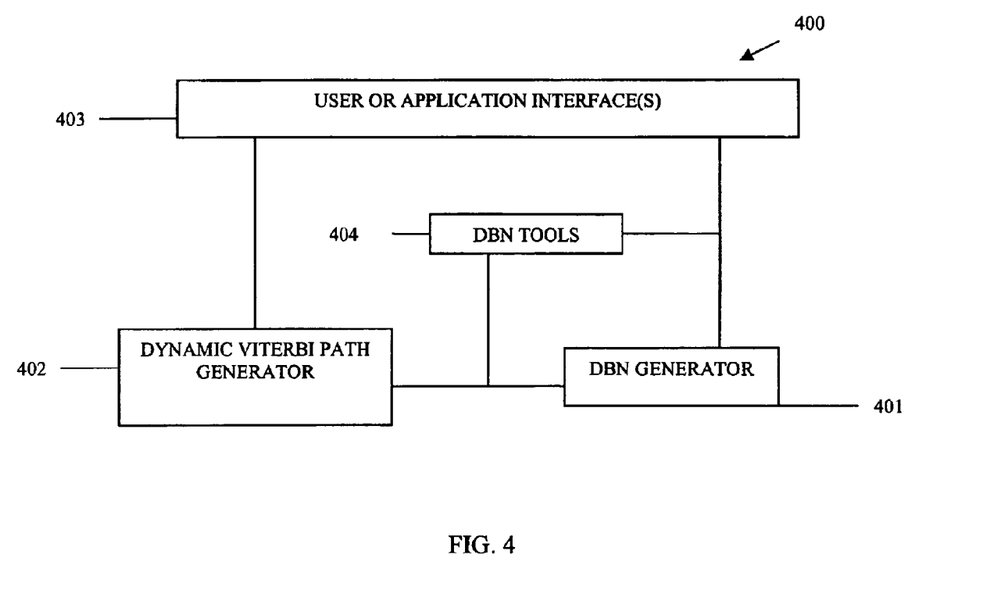
FIG. 4 is a diagram of Viterbi path generation system in accordance with one embodiment of the invention.

FIG. 4 is a diagram of a Viterbi path generation system 400. The Viterbi path generation system is implemented in a computer-accessible medium. Moreover, in some embodiments, various components of the Viterbi path generation system 400 are accessible over a network. The network can be wireless, hardwired, or a combination of wireless and hardwired.

The Viterbi path generation system includes a DBN generator 401 and a dynamic Viterbi path generator 402. A program interface 403 permits an end user or an automated application to initially access the DBN generator for purposes of creating an instance of a DBN and assigning probabilities to various decision states (nodes) of the DBN. The interface 403 can also be used to define a problem and an expected result along with observable evidence that is needed for various decision states of the DBN.

The interface 403 can be a series of separate and distinct interfaces or one integrated interface. Moreover, the interface 403 can be existing available interfaces 403 that are used to define an instance of a DBN and establish observable information, manually or from data files, data bases, other applications, and the like.

The interface 403 can also be used to execute the dynamic Viterbi path generator 402. When this occurs the Viterbi path generator 402 communicates with tools 404 of the DBN to derive junction trees, in-cliques, out-cliques, and other cliques for the DBN. Next, the Viterbi path generator 402 performs a forward iteration (forward pass) of each junction tree derived from the DBN beginning with the first junction tree.

During iterations, potentials or probabilities are initialized and observable evidence is collected for the current junction tree being evaluated. Next best path candidates from the out-clique through the current junction tree to the interface clique is determined. If during the current iteration there is a prior iteration for a previously processed junction tree, then a local backtracking operation is performed by the Viterbi path generator 402. The backtracking operation adjusts and links the best path candidates through the current junction tree to the best path candidates of the previously processed junction tree and makes adjustments where necessary. The processing restarts again for the next junction tree of the DBN until a complete forward pass has occurred on the DBN for each junction tree.

When the forward pass is completed, the pointers are iterated to assemble the completed Viterbi path; but there is no need to perform a complete backward iteration (backward pass) on the DBN as has been the case with conventional techniques. As a result, with embodiments of this invention, the processing and memory requirements needed to generate a Viterbi path are significantly reduced. Thus, decision processes that were previously not capable of utilizing a DBN application because of the large number of available decision states and possibilities can now enjoy the results associated with a DBN application with practical and useful performance metrics.

Figure 5:
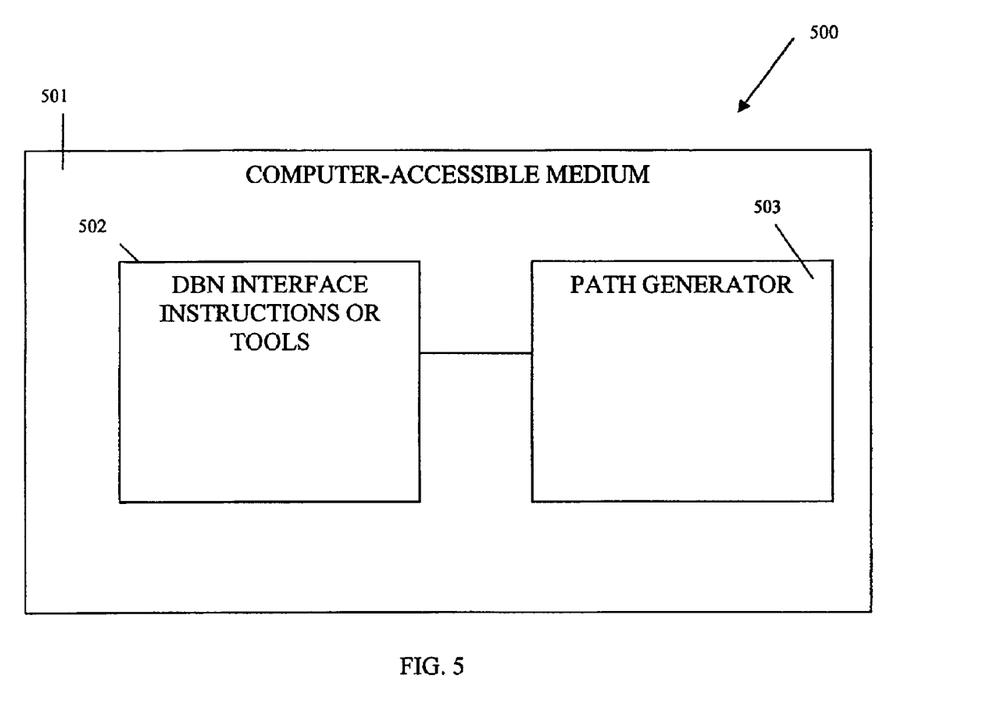
FIG. 5 is a diagram of a Viterbi path generation apparatus in accordance with one embodiment of the invention.

FIG. 5 is a diagram of a Viterbi path generation apparatus 500. The Viterbi path generation apparatus 500 is implemented on a computer accessible medium 501 as an application program. The Viterbi path generation 500 can be implemented as one or more software applications or as an Application Programming Interface (API). Moreover, in some embodiments the apparatus 500 is integrated with existing DBN tools and applications to perform dynamic Viterbi path generation in a single forward iteration (forward pass). Moreover, the apparatus 500 can be in operation or reside on one or more computer-accessible media 501 that can be interfaced to one or more processors and executed when needed. Thus, the apparatus 500 can be downloaded from a network to a processing device. Alternatively, the apparatus 500 can be placed on a removable storage media and interfaced to a processing device, or the apparatus 500 can be accessed directly over a network from a remote processing device that is capable of processing the instructions of the apparatus 500 remotely.

The Viterbi path generation apparatus 500 includes instructions 502 for interfacing with a DBN for purposes of representing a decision process in a computer-accessible medium and a path generator 503. In some embodiments, the Viterbi path generation apparatus 500 includes the instructions for generating and tools for manipulating 502 a DBN, in other embodiments, the apparatus 500 includes only instructions 502 for communicating with the DBN tools.

The path generator 502, when executed, performs a single forward iteration (forward pass) on the DBN for a given problem and result. After execution, a Viterbi path is produced for the given problem and result which represents the most probable explanation for the given result based on decision states and choices made within the DBN based on observable evidence for the given problem and potentials (probabilities) assigned to the trees that were derived from the DBN.

To achieve a Viterbi path generation for a single forward pass, the path generator 503 maintains backpointers to each previously processed junction tree of the DBN. When a pair of junction trees are available during an iteration of the forward pass, the path generator uses the backpointers of the previously processed junction tree (and its supporting sub trees (in-cliques, out-cliques, interface cliques, and other cliques)) to dynamically produce a best path candidate from the previous processed junction tree through the current junction tree being processed. One example set of pseudo code for achieving this is described and presented above with FIG. 1. After the forward pass is completed, the Viterbi path is immediately available and accessible through the retain pointers and dynamically assembled best path candidates. This Viterbi path depicts the most probable explanation for reaching a given result based on the observable evidence for the given problem.

The path generator 503 is more efficient than conventional Viterbi path generation techniques, since conventional techniques perform a full additional backward iteration (backward pass) on the DBN after the forward pass is completed. By performing only a single forward pass with selective local backtracking the processing and memory requirements typically required for generating a Viterbi path are significantly reduced.

The above description is illustrative, and not restrictive. Many other embodiments will be apparent to those of skill in the art upon reviewing the above description. The scope of embodiments of the invention should therefore be determined with reference to the appended claims, along with the full scope of equivalents to which such claims are entitled.

The Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject mater lies in less than all features of a single disclosed embodiment. Thus the following claims are hereby incorporated into the Description of the Embodiments, with each claim standing on its own as a separate exemplary embodiment.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. A method implemented in a computer-accessible medium and executed on one or more processors, the method comprising:
   (a) forwardly iterating trees of a Dynamic Bayesian Network (DBN) representing a decision process implemented in a computer-accessible medium; and
   (b) dynamically building a Viterbi path during forward iterations of (a) for a given problem; and
   (c) selectively backwardly evaluating pairs of the trees; and
   (d) dynamically assembling variables of the pairs that are needed for dynamically building the Viterbi path.

2. The method of claim 1 wherein (a) further includes (1) maintaining back pointers to previously processed trees and providing the back pointers to (b) for each iteration of (a).

3. The method of claim 2 wherein (a) further includes (2) maintaining the back pointers for (b) in data structures indexed on a current iteration through the trees for (a).

4. The method of claim 1 wherein (b) further includes (1) performing a local backtrack operation on a previously processed tree during iterations of (a).

5. The method of claim 4 wherein (b) further includes (2) iterating children nodes of a parent node identified as a root node of the previously processed tree.

6. The method of claim 4 wherein (b) further includes (2) identifying a best path from iterating the children nodes and concatenating the best path to the Viterbi path.

* * * * *